(12) United States Patent
Okada et al.

(10) Patent No.: US 6,781,641 B2
(45) Date of Patent: Aug. 24, 2004

(54) LIQUID CRYSTAL DISPLAY PROJECTOR

(75) Inventors: Takehiro Okada, Osaka (JP);
Masanari Hashimukai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 111 days.

(21) Appl. No.: 10/011,606

(22) Filed: Nov. 5, 2001

(65) Prior Publication Data

US 2002/0089612 A1 Jul. 11, 2002

(30) Foreign Application Priority Data

Nov. 13, 2000 (JP) ........................................ 2000-344780

(51) Int. Cl.[7] ........................................... G02F 1/1335
(52) U.S. Cl. ........................... 349/5; 349/96; 349/138; 349/122; 349/10; 349/86; 359/51; 359/52; 359/63; 359/40; 359/41; 353/121; 353/122
(58) Field of Search ............................ 349/5, 8, 98, 137, 349/102, 117, 161, 162, 96, 138, 122, 10, 86; 359/51, 52, 4, 63, 40, 41; 353/122, 121

(56) References Cited

U.S. PATENT DOCUMENTS

| 4,759,611 | A | | 7/1988 | Downey, Jr. | |
|---|---|---|---|---|---|
| 5,164,821 | A | * | 11/1992 | Tanaka et al. | 358/61 |
| 5,485,310 | A | | 1/1996 | Inada | |
| 5,617,226 | A | * | 4/1997 | Ohmae et al. | 349/10 |
| 5,772,299 | A | * | 6/1998 | Koo et al. | 353/20 |
| 6,042,234 | A | * | 3/2000 | Itoh | 353/20 |
| 6,078,363 | A | * | 6/2000 | Masuda et al. | 348/752 |
| 6,094,245 | A | * | 7/2000 | Ochi et al. | 349/96 |
| 6,111,700 | A | * | 8/2000 | Kobayashi et al. | 359/627 |
| 6,179,423 | B1 | * | 1/2001 | Kato et al. | 353/31 |
| 6,246,506 | B1 | * | 6/2001 | Kobayashi et al. | 359/246 |

FOREIGN PATENT DOCUMENTS

DE 69219443 T2 11/1997

* cited by examiner

Primary Examiner—Nathan J. Flynn
Assistant Examiner—Fazli Erdem
(74) Attorney, Agent, or Firm—RatnerPrestia

(57) ABSTRACT

A liquid crystal display (LCD) projector in which temperature rise of the polarizing plate is reduced and the liquid crystal display panels and polarizing plates are easily retained in place. In the LCD projector, at least one of the incident light side polarizing plate and the exit light side polarizing plate has a first polarizing plate disposed on the incident light side of a glass substrate and a second polarizing plate disposed on the exit light side of the glass substrate. The first polarizing plate has a low degree of polarization and the second polarizing plate has a high degree of polarization and the polarizing plates are arranged to have their axes of transmission polarization coincident. The temperature rise due to absorption of light is shared by the first and second polarizing plates and this contributes to reduction in size of the projector.

21 Claims, 8 Drawing Sheets

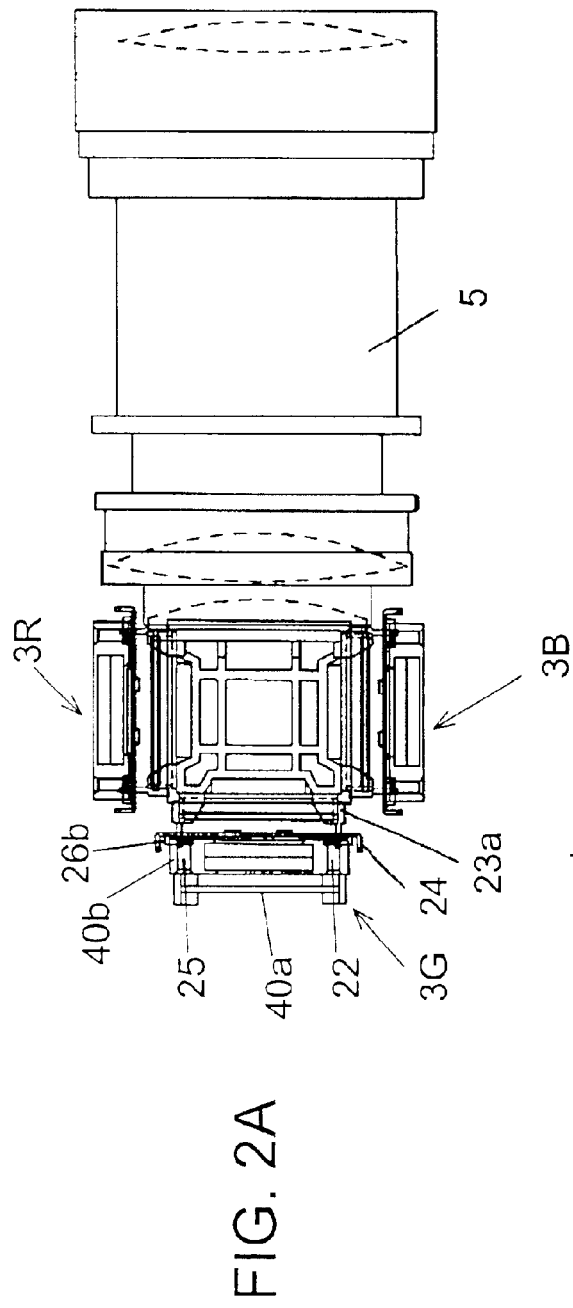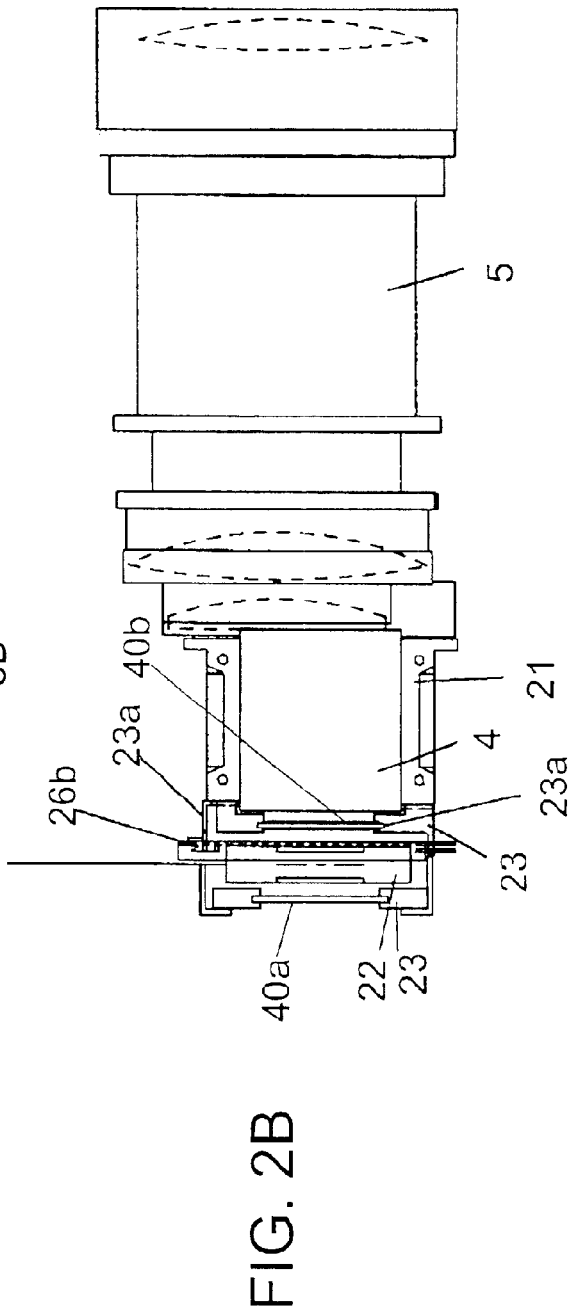
FIG. 2A
FIG. 2B

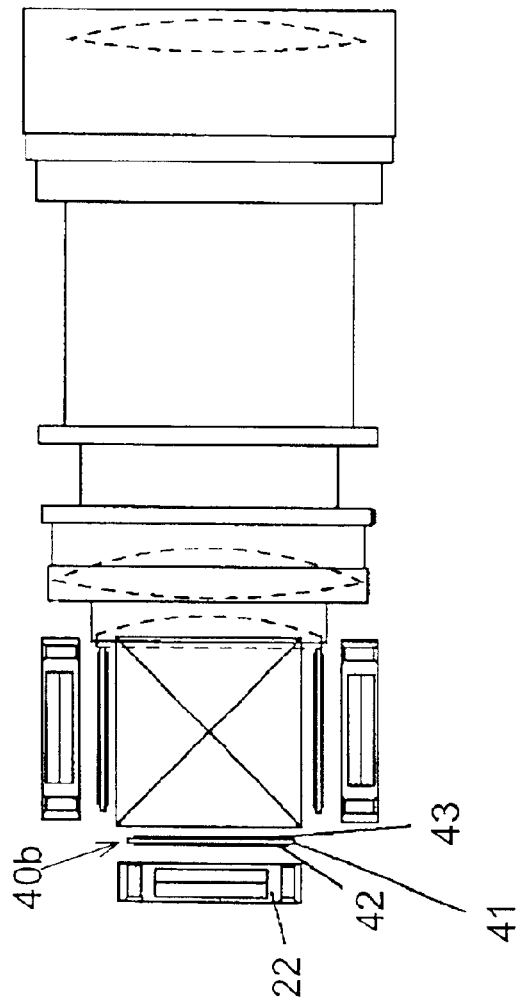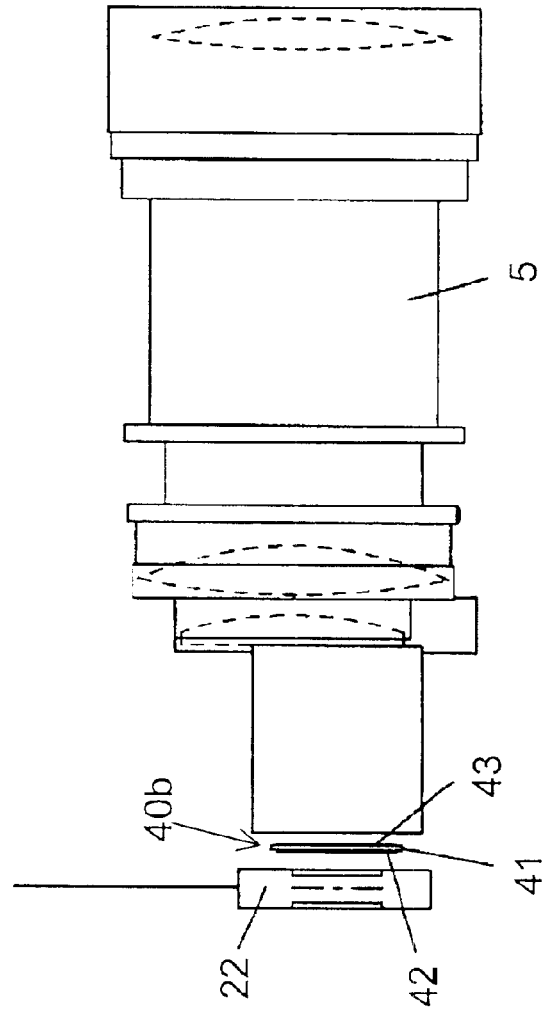
FIG. 3A
FIG. 3B

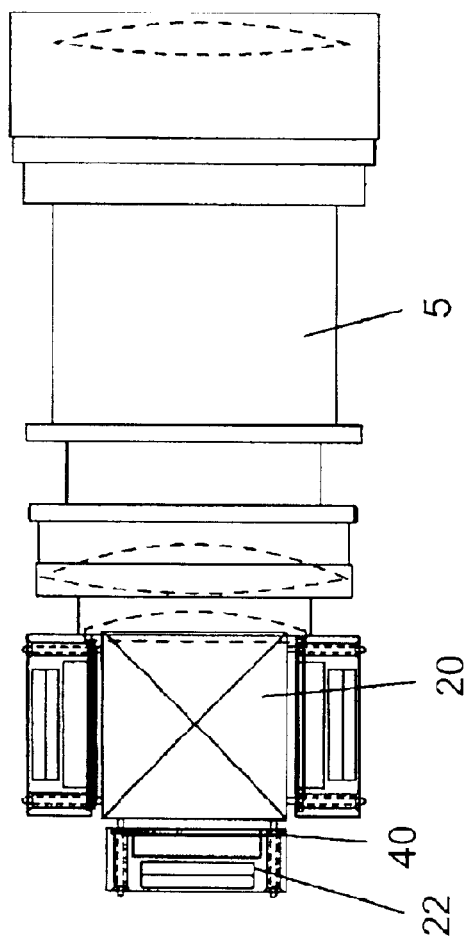
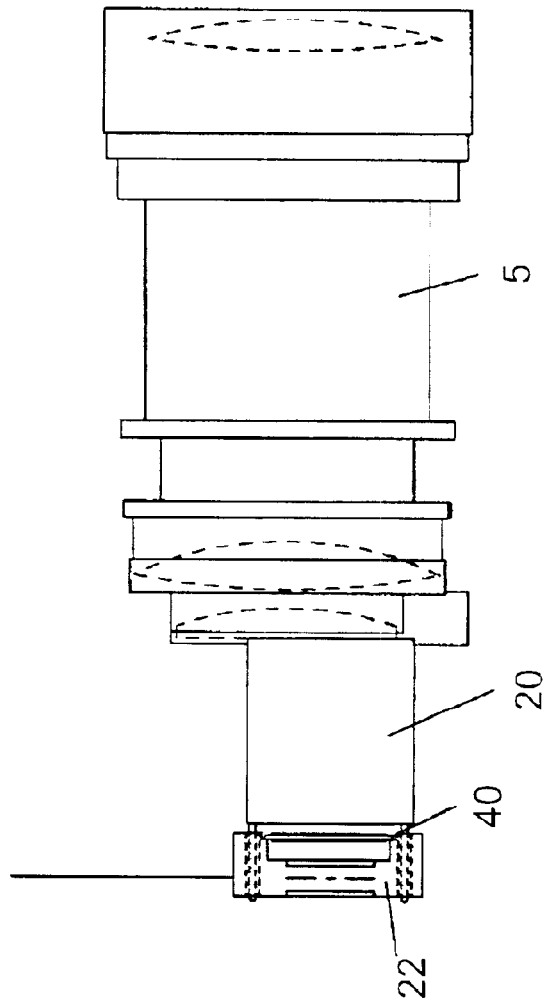
FIG. 4A
FIG. 4B

LIQUID CRYSTAL DISPLAY PROJECTOR

FIELD OF THE INVENTION

The present invention relates to a liquid crystal display projector for magnifying and projecting images and, more particularly, relates to a structure for retaining the liquid crystal display panel and polarizing plate in place.

BACKGROUND OF THE INVENTION

An LCD projector (hereinafter briefly called "projector") which magnifies and projects an image on a liquid crystal display (LCD) panel by using such a light source as a metal halide lamp has so far been in practical use. The projector converges beams of light emitted from a light source on an LCD panel through mirrors and the like and projects an image displayed on the LCD panel onto a screen through a projecting lens.

FIG. 7 shows a color combining unit in a conventional projector. Each of LCD panels 50R, 50G, and 50B corresponding to red (R), green (G), and blue (B) color light components has a polarizing plate disposed on the exit light side. There is shown in FIG. 7 polarizing plate 51R on the exit light side of LCD panel 50R. These polarizing plates are cemented to three faces of dichroic prism 52 located in the center of the color combining unit through retaining members such as metal clamps 53R, 53B, and 53G, or fastened to the same with screws 54 or the like.

The color combining unit structured as described above is joined to optical base 55 produced by aluminum die casting or the like. Walls provided on optical base 55 secures projecting lens 56 in a position normal to prism 52. Fan 57 for cooling LCD panel 50, polarizing plate 51, and others and branch duct 58 for guiding air sent from fan 57 are joined to the lower portion of optical base 55.

FIG. 8 shows details of the color combining unit. FIG. 8A is a plan view and FIG. 8B is a front view. Exit-side polarizing plate 60G disposed on the exit light side of LCD panel 50G has a substrate made of glass or the like and a polarizing film pasted on one side of the substrate and the same is positioned between LCD panel 50G and dichroic prism 61. Polarizing plate 60G has air passages formed on both its faces. Air sent from fan 57 is passed through the air passages and, as a consequence of it, the air provides cooling for heated polarizing plate 60G. The same also applies to polarizing plates 60R and 60B.

It is desired that brighter and smaller projectors be provided. When a projector comes to have higher brightness, it is made possible for users to view a projected image on a large screen even in a light room. Therefore, such a projector has recently been put to practical use that, for example, uses a 1.3-inch LCD panel and provides a light output of 3000 ANSI lumens.

Further, a smaller projector takes less space for installation. In order to obtain higher brightness, it is required that the intensity of light from the light source be increased and, in order to reduce the size, it is required that components of the projector be made smaller. Hence, it is nowadays being practiced to produce small projectors by using, for example, a 0.9-inch or a 0.7-inch LCD panel.

On the other hand, the greater the intensity of light from a light source, and the smaller the size of the components of a projector, such as the LCD panel and polarizing plate, the light quantity thrown on a unit area of the polarizing plate increases. Consequently, the light quantity absorbed by the polarizing plate per unit area increases and the quantity of generated heat increases.

Further, use of a small LCD panel makes it difficult to firmly hold LCD panel 50 and polarizing plate 51 in place with metal clamps 53 and also makes it difficult to secure sufficient air passages.

SUMMARY OF THE INVENTION

It is an object of the present invention to provide a simple structure suppressing temperature rise occurring in a polarizing plate, especially that occurring in a polarizing plate on the exit light side, thereby reducing deterioration of the polarizing plate.

In an LCD panel of the present invention, a color separating unit separates beams of light from a light source into red, blue, and green color components. Each liquid crystal display (LCD) panel modulates each of separated red, blue, and green light components. An incident-side polarizing plate is disposed on the incident light side of the LCD panel and transmits polarized light in one direction. An exit-side polarizing plate is disposed on the exit light side of the LCD panel and transmits polarized light in another direction. A color combining unit combines modulated light beams. A projecting lens projects the combined light beams.

In a projector as described above, at least one of the incident-side polarizing plate and the exit-side polarizing plate is a polarizing plate unit having a first polarizing member provided on one face and a second polarizing member provided on the other face of a glass substrate.

BRIEF DESCRIPTION OF THE DRAWINGS

FIG. 2A is a plan view showing details of an LCD panel block.

FIG. 2B is a front view showing details of an LCD panel block.

FIG. 3A is a plan view diagrammatically showing only relationships among a polarizing plate unit and other elements, with retaining members thereof omitted.

FIG. 3B is a front view diagrammatically showing only relationships among a polarizing plate unit and other elements, with retaining members thereof omitted.

FIG. 4A is a plan view showing an LCD panel block in a second embodiment.

FIG. 4B is a front view showing an LCD panel block in a second embodiment.

DESCRIPTION OF THE PREFERRED EMBODIMENTS (First Exemplary Embodiment)

Figure 1A:
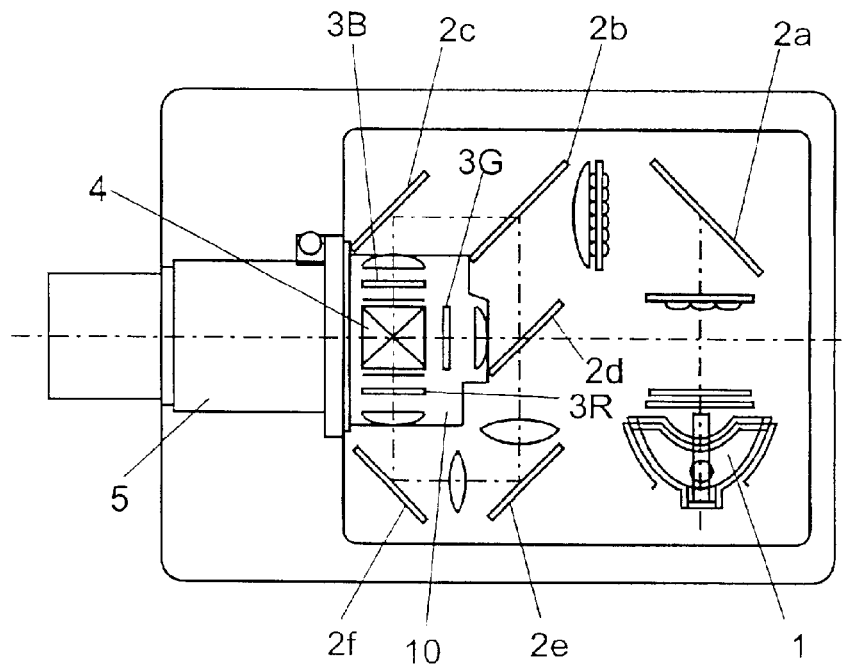
FIG. 1A is a plan view showing a concept of an LCD projector in an embodiment of the present invention.
Figure 1B:
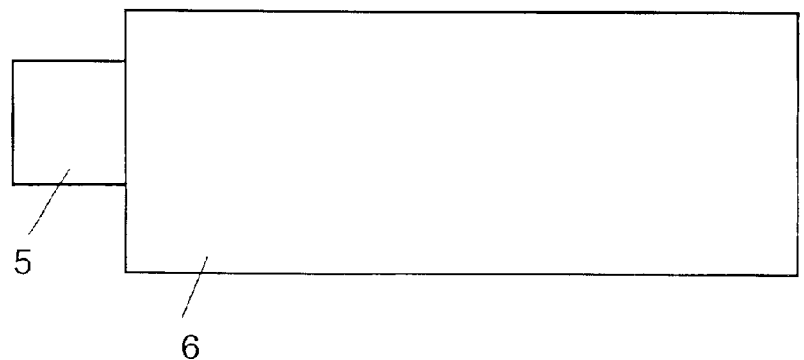
FIG. 1B is a front view showing a concept of an LCD projector in an embodiment of the present invention.

FIG. 1 shows a concept of a triplet type liquid crystal display (LCD) projector (hereinafter, called "projector") according to an embodiment of the present invention. FIG. 1A is plan view and FIG. 1B is a front view.

In the optical system of the projector, light beams from lamp 1 as a light source are separated into red (red), green (G), and blue (B) color light components by means of a plurality of total reflection mirrors 2a, 2c, 2e, and 2f and dichroic mirrors 2b and 2d. Mirror 2b transmits only the R light component and reflects other components. Mirror 2d reflects only the G light component and transmits other components. As a result, the R component is thrown on LCD panel block 3R, the G component on 3G, and the B component on 3B.

By controlling voltages applied to each of pixels in blocks 3R, 3G, and 3B, full-white, full-black, and halftone light control can be carried out. Dichroic prism 4 combines R, G, and B light components gone through the light control for each of pixels. Projecting lens 5 magnifies and projects the combined light beams. Blocks 3R, 3G, and 3B and prism 4 are installed on optical base 10. Housing 6 contains the above optical system, a signal processing unit, and a power source.

Figure 1C:
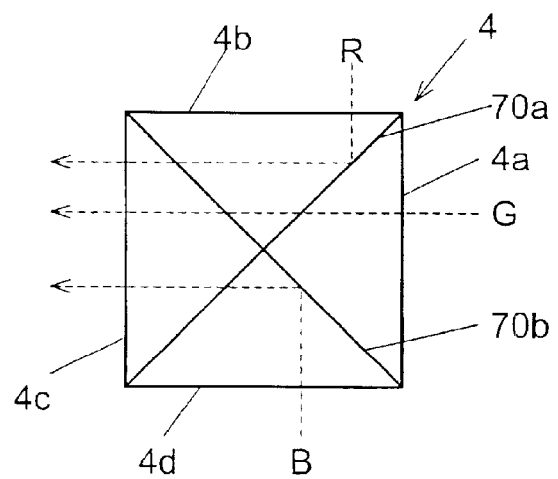
FIG. 1C is a plan view showing a structure of a dichroic prism.

FIG. 1C shows a structure of prism 4.

Prism 4 has three triangular prisms 4a, 4b, 4c, and 4d. On interfaces 70a and 70b, there are formed coatings of evaporated film or the like reflecting or transmitting R, G, or B light component. Interface 70a reflects R light component and transmits other light components. Interface 70b reflects B light component and transmits other light components. As a result, a combination of R, G, and B light components is emitted from prism 4c.

FIG. 2 shows details of an installing method of prism 4 and blocks 3R, 3G, and 3B. FIG. 2A is a plan view and FIG. 2B is a front view.

Prism 4 is incorporated in resin-molded prism mount 21 by being sandwiched between the upper and lower portions of mount 21. Blocks 3R, 3G, and 3B each have LCD panel unit 22 (hereinafter called "panel 22"), two polarizing plates 40a, 40b, and junction base 23. Panel 22 has an LCD panel and a case for holding the same. Junction base 23 has the same shape as prism mount 21. Base 23 fixes incident-side polarizing plate 40a at a predetermined distance from panel 22 on the incident light side of panel 22. Further, base 23 fixes exit-side polarizing plate 40b at a predetermined distance from panel 22 on the exit light side of panel 22. This arrangement allows blocks 3R, 3G, and 3B to secure cooling air passages around panel 22 and polarizing plates 40a and 40b.

For convenience of explanation, the structure of the LCD panel unit described above is shown only for block 3G in FIG. 2. Illustration of detailed mounting structure is omitted for blocks 3R and 3B.

Junction base 23 has six protrusions 23a corresponding to each of the LCD panels. Panel 22 is fixed to panel mount 24 with screws 25. Panel mount 24 has four holes 26b corresponding to two each of protrusions 23a of junction base 23. In comparison with the diameter and height of protrusions 23a, the diameter and depth of hole 26b is given a margin for convergence adjustments to be performed later, in to-and-fro and side-to-side directions.

Junction base 23 is connected with prism mount 21. Thus, panel 22 is firmly integrated with dichroic prism 4 by means of panel mount 24 and upper and lower junction bases 23.

Generally, convergence adjustments are performed by the operator, while viewing the projected screen, by taking the R, G, and B pixels projected on LCD panels with a camera and making six-axis adjustments (displacements in and rotation about X, Y, and Z axes) (details thereof are omitted here). Upon completion of convergence adjustments for each of LCD panels, a solder, an ultraviolet (UV) setting cement, or the like is filled into holes 26b so that panel 22 is retained by upper and lower junction bases 23.

FIG. 3 is a diagram showing only positional relationships among panel 22, exit-side polarizing plate 40b, prism 4, and projecting lens 5, with holding members of each thereof omitted. FIG. 3A is a plan view and FIG. 3B is a front view.

Polarizing plate 40b is such a polarizing plate unit that has glass substrate 41; and low-degree polarizing film 42 pasted on the incident light side of substrate 41, and high-degree polarizing plate 43 pasted on the exit light side of substrate 41, as polarizing members. Here, transmission polarization axes of film 42 and film 43 are coincident.

The degree of polarization of high-degree polarizing plate 43 is higher than that of low-degree polarizing plate 42. Hence, film 42 and film 43 share the absorption of light by films as the polarizing members and resultant temperature rise.

As the material of substrate 41, such a material having a good heat radiating property as sapphire glass, obtained by slicing sapphire having an excellent heat radiating property, is desirable.

Further, for example, the most desirable degree of polarization of film 42 is around 50%, followed by the next desirable degree between 40% and 60%. This is because film 42 and film 43 share virtually one half each of the light quantity absorbed by the polarizing plates.

In three LCD panel blocks 3R, 3G, and 3B according to the present embodiment, exit-side polarizing plate 40b has films disposed on both faces of substrate 41. However, when there is some margin in the temperature specification of the film, depending on the relationship between the luminous flux quantity and the temperature rise of the polarizing plate, such polarizing plate 40b from which film 42 is eliminated may, for example, be used for some of the LCD panel blocks.

When a black display is made in the projector of the above described configuration, most of the light transmitted through panel 22 is absorbed by polarizing plate 40b. At this time, a portion of the light is first absorbed by low-degree polarizing plate 42. Then, most of the remaining portion of the light is absorbed by high-degree polarizing plate 43. Since increases in temperature are thus shared by two films 42 and 43 disposed on both faces of polarizing plate 40b, heat radiation can be performed effectively.

It is confirmed by experiments that heat radiation from two films 42 and 43 in elevated temperatures is enhanced when sapphire glass, which provides an excellent heat radiating substrate, is used as glass substrate 41. However, ordinary glass may be used when there is some margin in the temperature specification.

According to the present embodiment, as described above, it is made possible to prevent deterioration of the polarizing plate due to heat generation as a consequence of making projectors higher in brightness and smaller in size. Therefore, it can further be prevented that a polarizing plate made of an organic high polymer material suffers a change in color or light-passing by temperature rise to deteriorate its function as a polarizing plate.

According to the present embodiment as described above, a LCD projector having an optical system excellent in radiating property can be realized by using small LCD panels and polarizing plates.

In the foregoing, description has been given about heat radiation from the polarizing plate on the exit light side where, generally speaking, temperature rise is greater.

On the other hand, a polarizing plate on the incident light side align the plane of polarization of the transmitted light therethrough. At this time, light beam components not along the plane of polarization are absorbed by the polarizing plate and, hence, a temperature rise occurs therein. This temperature rise might have a nonnegligible adverse effect on a small-sized projector so far described. Therefore, by using a polarizing plate that has similar configuration to that of the polarizing plate on the exit light side also on the incident light side, a projector much more excellent in heat radiating property can be obtained.

As described in the foregoing, a projector being small in size yet working with a large quantity of light and capable of projecting an image of high brightness can be obtained.

(Second Exemplary Embodiment)

FIG. 4 shows details of an LCD panel block in which a polarizing plate mount is integrated with an LCD panel. FIG. 4A is a plan view and FIG. 4B is a front view.

In the LCD panel block, the case of LCD panel unit 22 is configured to integrally hold exit-side polarizing plate 40b. Otherwise, the structure is the same as that of the first exemplary embodiment and, hence, explanation of the structure will be omitted.

Figure 5C:
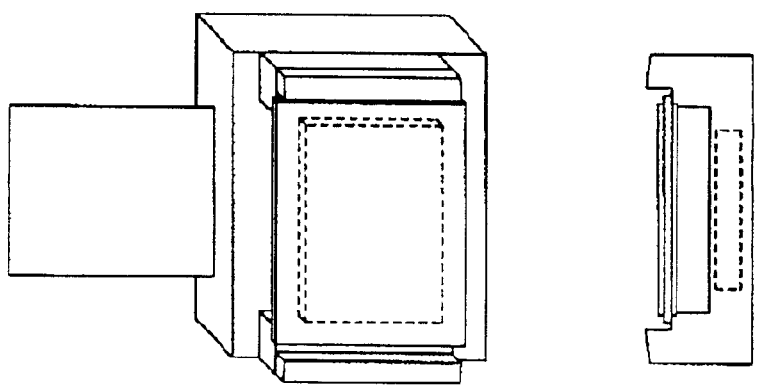
FIGS. 5A–5C are perspective views showing a manner of assembling a part of an LCD panel block.
Figure 5B:
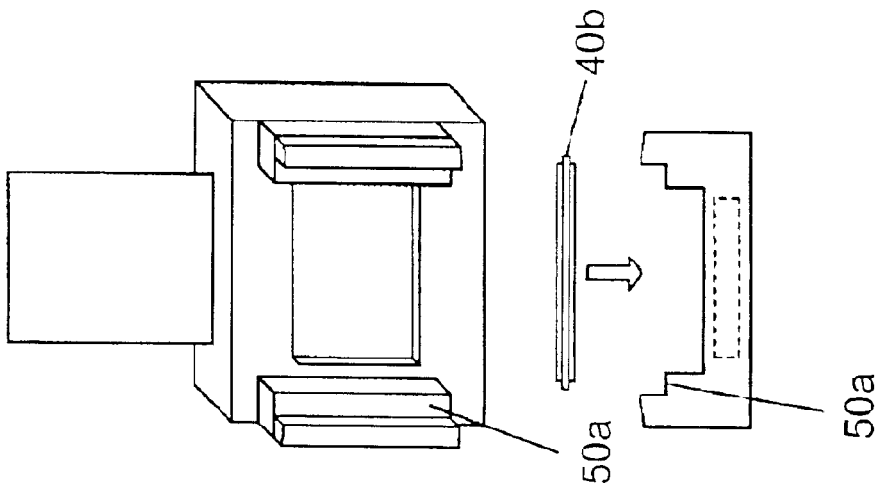
Figure 5A:
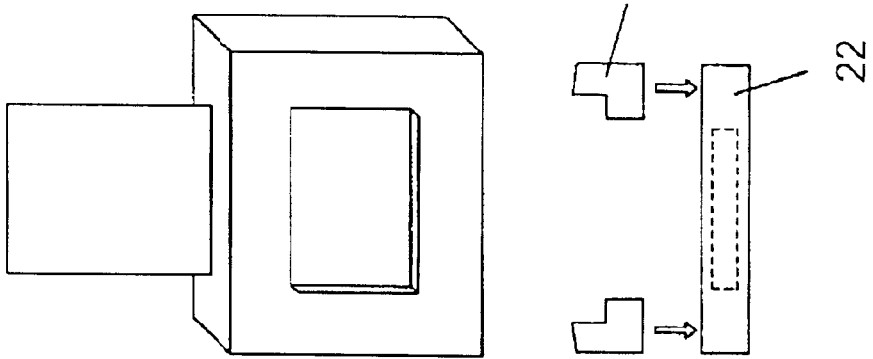

FIGS. 5A–5C are perspective views showing steps in a sequence of fabrication of the LCD panel block.

Referring to FIG. 5A, panel 22 has polarizing plate holder 50 integral therewith. Referring to FIG. 5B, holder 50 has polarizing plate mount 50a on both sides or around the entire circumference of holder 50. Polarizing plate 40b is joined to the surface of mount 50a. FIG. 5C is a completion drawing of fabrication. The described configuration can also be applied to integration of incident-side polarizing plate 40a with LCD panel unit 22.

Figure 6A:
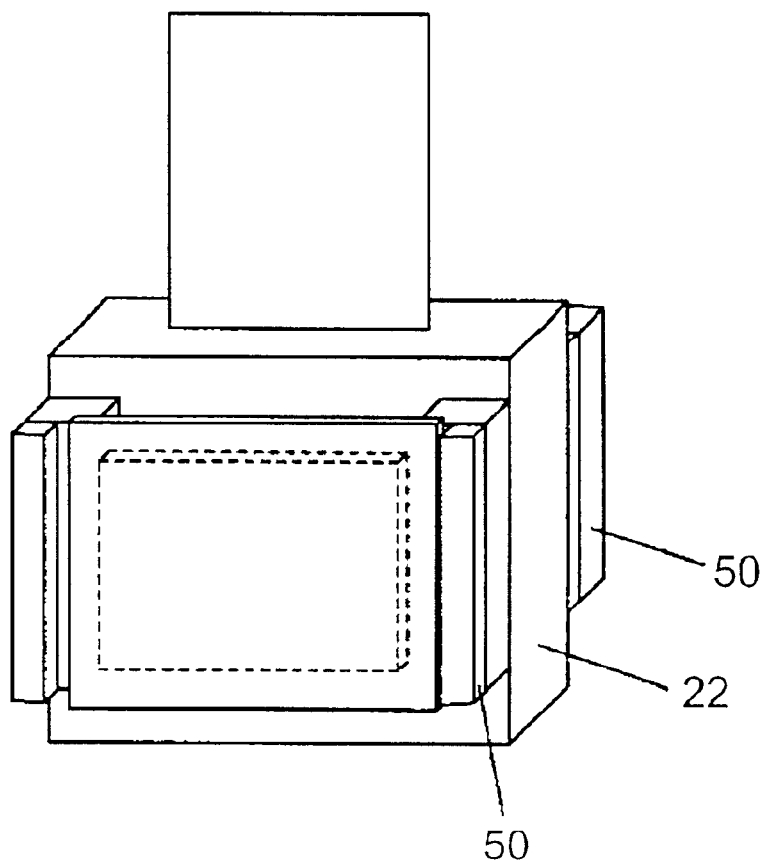
FIG. 6A is a perspective view showing a structure of an LCD panel block in which a polarizing plate is also provided on the incident light side and FIG. 6B is a front view of the same.
Figure 6B:
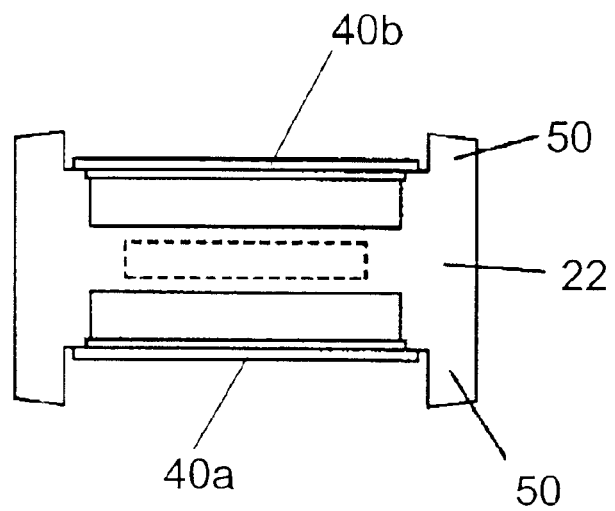
Figure 7:
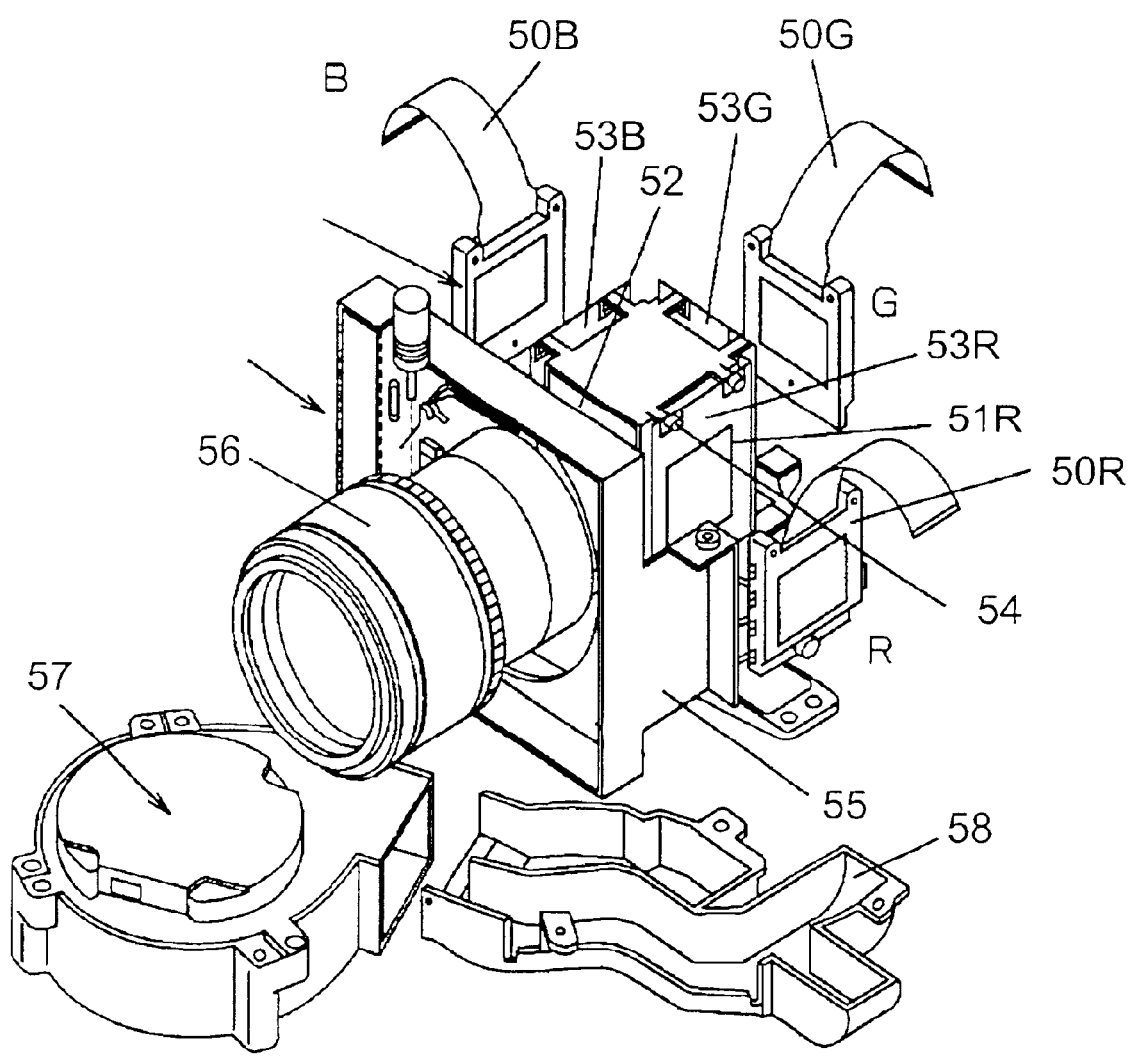
FIG. 7 is a perspective view of important part showing a color combining unit in a conventional LCD projector.
Figure 8A:
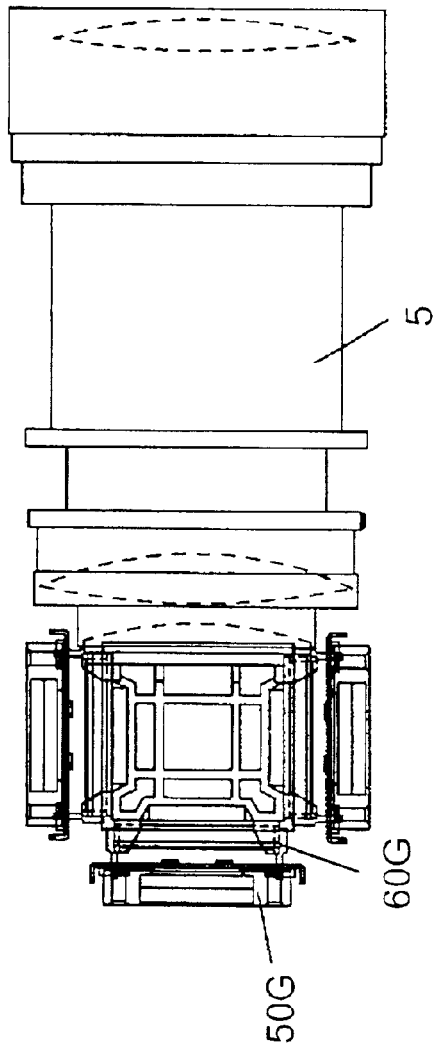
FIG. 8A is a plan view of a conventional color combining unit.
Figure 8B:
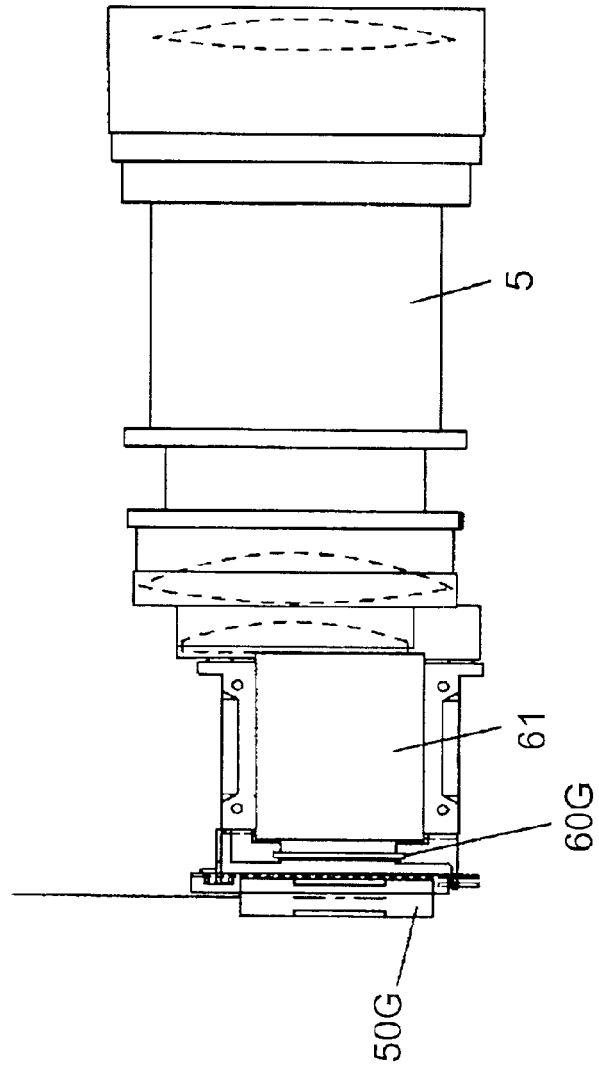
FIG. 8B is a front view of a conventional color combining unit.

FIGS. 6A and B show a configuration having a polarizing plate integral with an LCD panel unit on its incident light side.

By virtue of the configuration in which polarizing plates 40a and 40b are formed integral with panel 22, a reduction in size of the projector can be attained while air passages are secured on both sides of the LCD panel and the polarizing plate. Accordingly, a small sized projector can be obtained while its cooling effect is preserved.

According to the present exemplary embodiment, the case of the LCD panel can be formed integral with both the exit-side polarizing plate and the incident-side polarizing plate, each thereof having the first polarizing film provided on one face and the second polarizing film provided on the other face of a glass plate. Thus, an LCD projector in which LCD panels and polarizing plates are easily attached to the prism without the need for a metal clamp can be obtained.

Further, air passages can be provided for the first and second polarizing film faces. Hence, an LCD projector in which cooling is performed readily and effectively can be obtained.

According to the present invention, as described above, a projector being small in size yet working with a large quantity of light and capable of projecting an image of high brightness can be obtained. Further, a projector allowing LCD panel units to be easily installed therein and excellent in cooling capability can be obtained.

What is claimed is:

1. A liquid crystal display (LCD) projector for use with a light source, comprising:
   a color separating unit for separating light beams from said light source into red, blue, and green light components;
   an LCD panel for modulating each of the separated red, blue, and green light components;
   an incident-side polarizing plate disposed on an incident light side of said LCD panel for transmitting polarized light in one direction;
   an exit-side polarizing plate disposed on an exit light side of said LCD panel for transmitting polarized light in one direction;
   a color combining unit for combining the modulated light beams; and
   a projecting lens for projecting the combined light beams;
   wherein at least one of said incident-side polarizing plate and said exit-side polarizing plate has:
      a glass substrate including an incident light side surface and an exit light side surface;
      a first polarizing member provided on the incident light side surface of the glass substrate; and
      a second polarizing member provided on the exit light side surface of the glass substrate.

2. The LCD projector according to claim 1, wherein degree of polarization of the first polarizing member is lower than degree of polarization of the second polarizing member and the first polarizing member and the second polarizing member are arranged to have their axes of transmission polarization coincident.

3. The LCD projector according to claim 1, wherein degree of polarization of the first polarizing member is substantially 50%.

4. The LCD projector according to claim 2, wherein degree of polarization of the first polarizing member is substantially 50%.

5. The LCD projector according to claim 1, wherein degree of polarization of the first polarizing member is between 40% and 60%.

6. The LCD projector according to claim 2, wherein degree of polarization of the first polarizing member is between 40% and 60%.

7. The LCD projector according to claim 1, wherein the glass substrate includes sapphire glass.

8. The LCD projector according to claim 2, wherein the glass substrate includes sapphire glass.

9. The LCD projector according to claim 1, wherein at least one of said incident-side polarizing plate and said exit-side polarizing plate is formed integral with said liquid crystal display panel within a case of said liquid crystal display panel and there are provided air passages along the first and second polarizing members.

10. The LCD projector according to claim 2, wherein at least one of said incident-side polarizing plate and said exit-side polarizing plate is formed integral with said liquid crystal display panel within a case of said liquid crystal display panel and there are provided air passages along the first and second polarizing members.

11. The LCD projector according to claim 1, wherein the first polarizing member and the second polarizing member are formed of a film.

12. The LCD projector according to claim 2, wherein the first polarizing member and the second polarizing member are formed of a film.

13. The LCD projector according to claim 3, wherein the first polarizing member and the second polarizing member are formed of a film.

14. The LCD projector according to claim 4, wherein the first polarizing member and the second polarizing member are formed of a film.

15. The LCD projector according to claim 5, wherein the first polarizing member and the second polarizing member are formed of a film.

16. The LCD projector according to claim 6, wherein the first polarizing member and the second polarizing member are formed of a film.

17. The LCD projector according to claim 7, wherein the first polarizing member and the second polarizing member are formed of a film.

18. The LCD projector according to claim 8, wherein the first polarizing member and the second polarizing member are formed of a film.

19. The LCD projector according to claim 9, wherein the first polarizing member and the second polarizing member are formed of a film.

20. The LCD projector according to claim 10, wherein the first polarizing member and the second polarizing member are formed of a film.

21. The LCD projector according to claim 11, wherein the first polarizing member and the second polarizing member are formed of a film.

* * * * *